(No Model.)

W. E. LEWIS.
CULINARY APPARATUS.

No. 473,400. Patented Apr. 19, 1892.

Witnesses

Inventor
W. E. Lewis.

By his Attorneys,

UNITED STATES PATENT OFFICE.

WILLIAM E. LEWIS, OF PEMAQUID, MAINE.

CULINARY APPARATUS.

SPECIFICATION forming part of Letters Patent No. 473,400, dated April 19, 1892.

Application filed March 11, 1891. Serial No. 384,605. (No model.)

*To all whom it may concern:*

Be it known that I, WILLIAM E. LEWIS, a citizen of the United States, residing at Pemaquid, in the county of Lincoln and State of Maine, have invented a new and useful Culinary Apparatus, of which the following is a specification.

This invention relates to culinary apparatus; and it consists more particularly in an improved cover for pots and kettles, and in cooking vessels adapted to be used in combination with such cover, whereby such cooking-vessels may be suspended from the under side of the cover within a pot or kettle to which the said cover is fitted, as will be hereinafter more fully described, and particularly pointed out in the claims.

Figure 1:
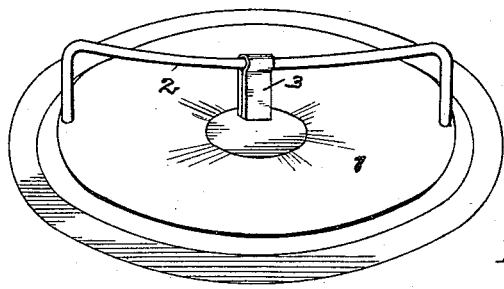
Figure 2:
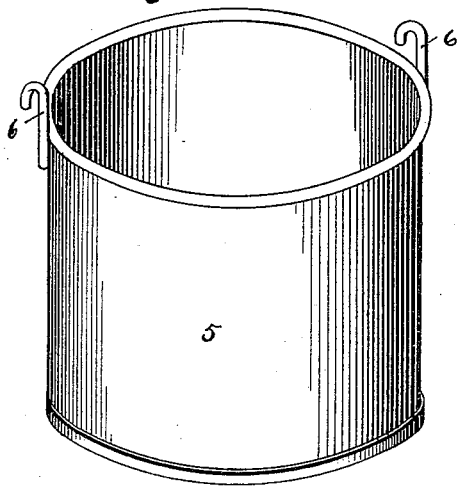
Figure 3:
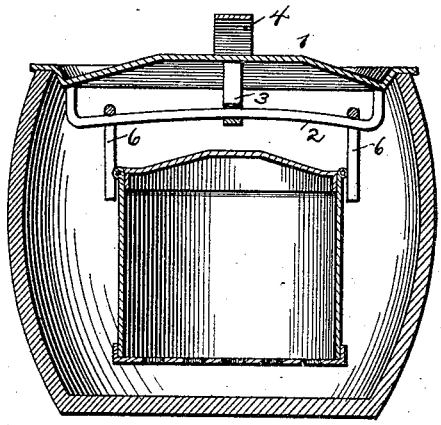
Figure 4:
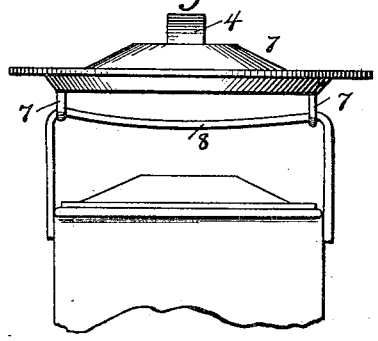

In the drawings hereto annexed, Figure 1 is a perspective view showing the kettle-cover which constitutes a part of my invention in an inverted position. Fig. 2 is a perspective view of a cooking-vessel adapted to be used in combination with the said cover. Fig. 3 is a vertical sectional view of a pot or kettle having my improved cover and a cooking-vessel suspended from the same within the pot or kettle. Fig. 4 is a detail view illustrating a modification of the invention.

Like numerals of reference indicate like parts in all the figures.

1 designates an ordinary pot-cover, to the under side of which is applied a transverse bail or bracket 2, which may be made of wire and which may be soldered or otherwise suitably secured to the said cover. One or more additional braces, as 3, may be employed to afford additional strength and security in the attachment of the said bail or bracket. The upper side of the cover is provided in the usual manner with a handle 4. The crossbar of the transverse bail or bracket 2 is preferably arched or curved in an upward direction toward the center, as will be clearly seen in Fig. 3 of the drawings. It may, however, if preferred, be entirely straight, or it may be curved in a downward direction.

The cooking-vessel to be used in connection with my improved cover may be an ordinary strainer, as shown at 5 in Fig. 2 of the drawings. It is provided at its upper edge on diametrically opposite sides with hooks 6, adapted to engage the bail or bracket on the under side of the cover from which the said cooking-vessel may thus be suspended. It will be understood, however, that numerous cooking-vessels of different sizes and constructions may be used in connection with my improved cover. Thus, for instance, may the cooking-vessel consist of an ordinary covered kettle of suitable size, or it may consist of a dish suitably constructed of a wire for the purpose of boiling fish and the like, which may thus be readily removed from the pot or kettle without danger of breaking. The only necessary requisite is that the cooking-vessel shall be provided with suitable hooks or catches to engage the bail on the under side of the cover.

My invention is susceptible of various modifications. Thus, for instance, as will be seen in Fig. 4, the under side of the cover may be provided with hooks adapted to engage a bail or bracket upon the cooking-vessel, such hooks being designated by 7 and the bail or bracket by 8.

Having thus described my invention, I claim and desire to secure by Letters Patent of the United States—

1. The combination of the pot, the pot-cover, a transverse bail arranged on one of the parts, and diametrically-opposite hooks arranged on the other part and adapted to be engaged by the bail, whereby the pot is suspended from the cover, substantially as described.

2. A pot-cover provided on its under side with a transverse bail or bracket, in combination with a cooking-vessel provided at its upper edge with diametrically-opposite hooks to engage said bail or bracket, substantially as set forth.

In testimony that I claim the foregoing as my own I have hereto affixed my signature in presence of two witnesses.

WILLIAM E. LEWIS.

Witnesses:
E. S. ELLIOTT,
W. P. FOSSETT.